United States Patent [19]
Hold et al.

[11] 4,227,816
[45] Oct. 14, 1980

[54] ROTARY PROCESSOR

[75] Inventors: Peter Hold, Milford, Conn.; Zehev Tadmor, Teaneck, N.J.

[73] Assignee: USM Corporation, Farmington, Conn.

[21] Appl. No.: 935,257

[22] Filed: Aug. 21, 1978

[51] Int. Cl.³ .......................... B01F 7/08; B28C 1/16
[52] U.S. Cl. ...................................... 366/99; 366/307; 415/102; 425/204
[58] Field of Search .................. 366/99, 98, 266, 80, 366/307, 314, 315, 316, 87, 90; 425/204, 209; 415/90, 102

[56] References Cited

U.S. PATENT DOCUMENTS

| | | | |
|---|---|---|---|
| 1,069,408 | 8/1913 | Gaeda . | |
| 2,798,693 | 7/1957 | Dooley . | |
| 2,813,302 | 11/1957 | Beck | 425/204 X |
| 2,973,946 | 3/1961 | Bauling et al. . | |
| 3,778,036 | 12/1973 | Collin | 425/209 |
| 3,794,449 | 2/1974 | Brouwer | 415/90 |
| 3,941,355 | 3/1976 | Simpson | 366/99 |

FOREIGN PATENT DOCUMENTS

| | | | |
|---|---|---|---|
| 2034285 | 1/1972 | Fed. Rep. of Germany | 415/90 |
| 452393 | 3/1913 | France | 415/90 |
| 2324444 | 4/1977 | France . | |
| 278536 | 10/1927 | United Kingdom . | |
| 497549 | 12/1939 | United Kingdom . | |
| 821426 | 10/1959 | United Kingdom . | |
| 1144184 | 5/1969 | United Kingdom . | |
| 1370894 | 10/1974 | United Kingdom . | |
| 1405507 | 9/1975 | United Kingdom . | |
| 1421453 | 1/1976 | United Kingdom . | |

*Primary Examiner*—Billy S. Taylor
*Attorney, Agent, or Firm*—John P. Morley; Richard B. Megley; Vincent A. White

[57] ABSTRACT

A multi-stage rotary processor for plastic and polymeric materials which are, or become in the course of processing, viscous liquids, including an annular housing, a rotor coaxial with and rotatable with respect to the housing and having a cylindrical surface in slidable sealing relation with the interior of the housing, a plurality of annular channels formed in the cylindrical surface and cooperating with the housing to form annular processing passages, transfer passages, which are preferably channels in the surface of the housing for cooperation with the cylindrical portions of the rotor, to provide passage for transfer of material between processing passages and blocking members extending into the channels to hold material in the processing passages for relative movement with respect to the channel walls for processing. In a preferred structure the transfer channels are formed and the blocking members may be mounted in removable flow director units including surfaces forming part of the surface of the annular housing.

30 Claims, 7 Drawing Figures

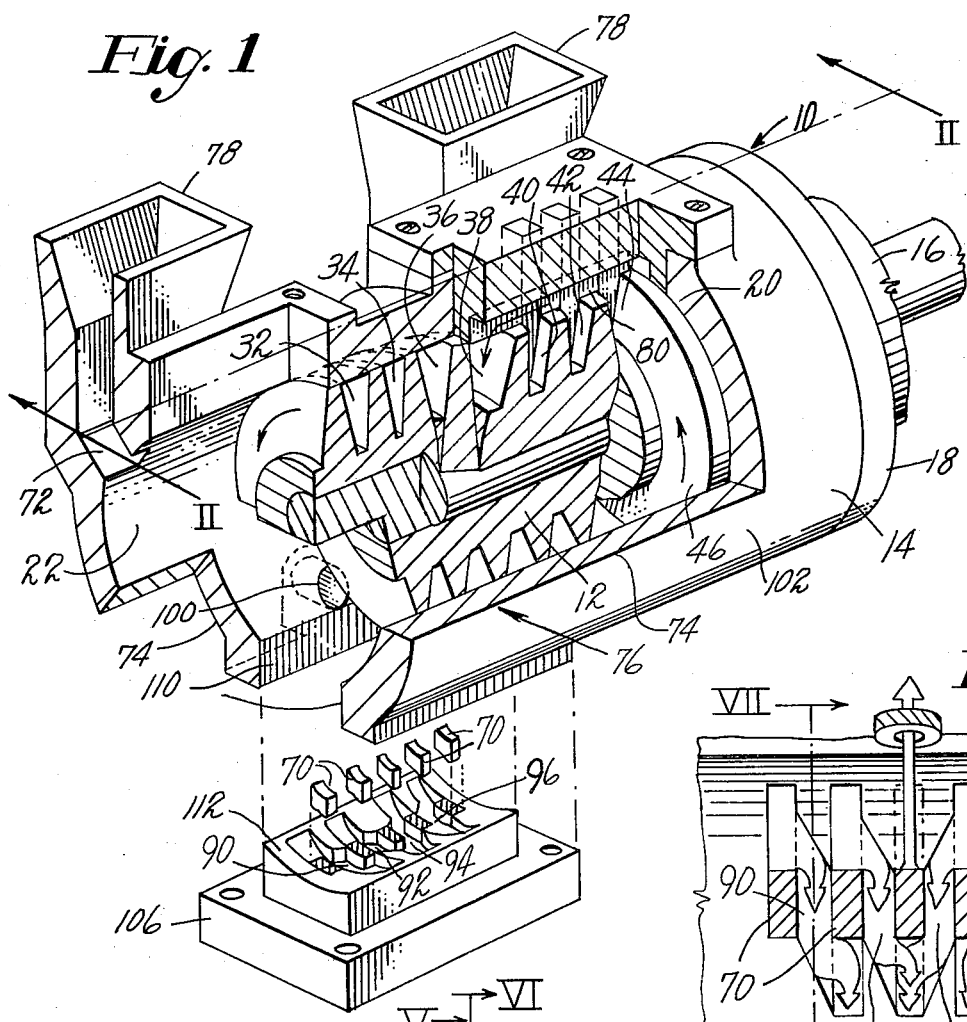
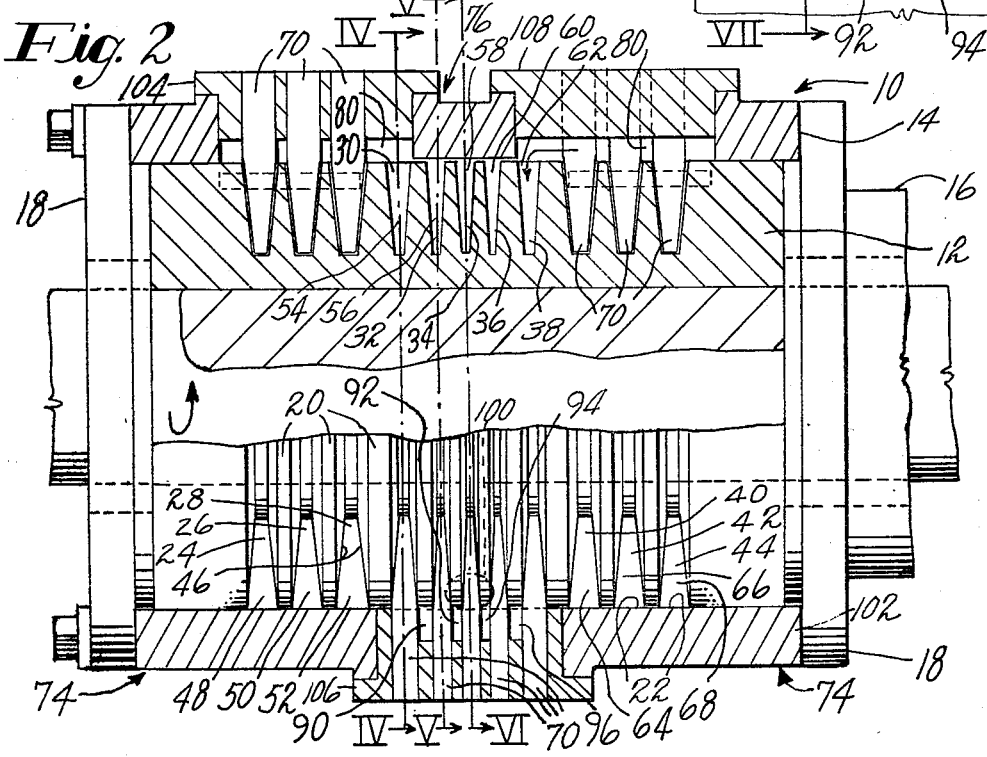

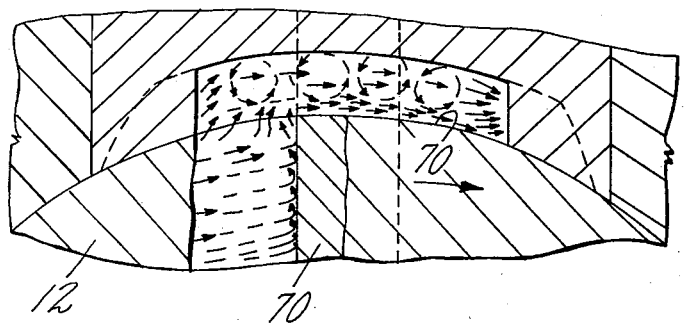
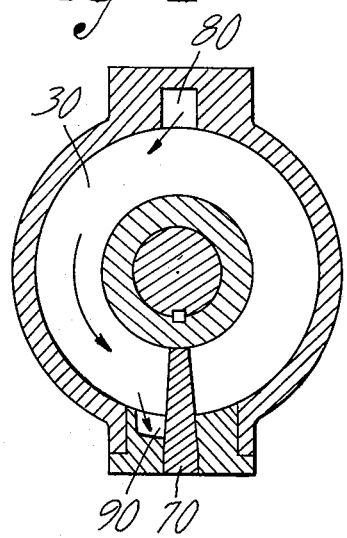
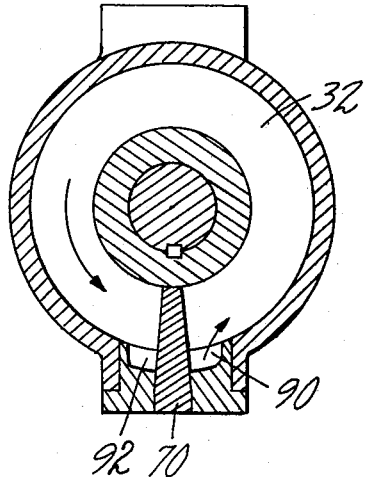
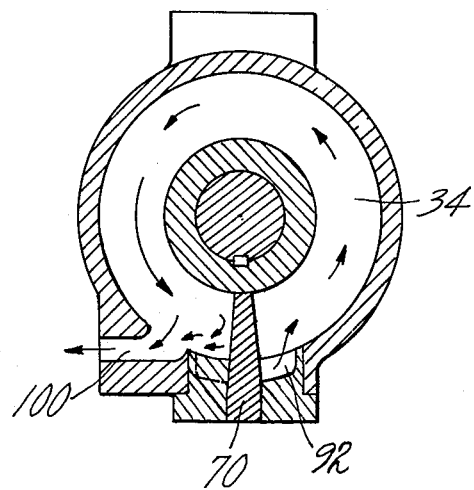

ROTARY PROCESSOR

FIELD OF THE INVENTION

This invention relates to a machine for processing plastic and polymeric materials which are, or become in the course of processing, viscous liquids.

BACKGROUND OF THE INVENTION

An important departure from screw-type extruder machine for processing plastic and polymeric materials is the rotary processor described and claimed in the application of Zehev Tadmor, Ser. No. 795,211 filed May 11, 1977 (now U.S. Pat. No. 4,142,805) as a Continuation in Part of Application Ser. No. 654,040 filed Feb. 2, 1976 (now abandoned).

The machine of the Tadmor application includes one or more annular channels for rotation in close engagement with an annular housing which forms, with the channel, an enclosed passage. A channel block is disposed in the channel to hold material in the channel for movement relative to the channel surface when the annular channel is rotated so that the movement of the walls of the channel acts on material in the channel for processing such as melting or plasticating, conveying, pumping or pressurizing viscous liquid material, mixing, blending etc. The application discloses, as one modification, a machine in which processed material discharged from the outlet of one channel enters a conduit which conducts it around the outside of the housing and introduces it to the inlet of a succeeding processing channel.

It has been found however that frictional forces and heat losses involved in the use of such a conduit are undesirably high, that keeping the conduit clear and free from degraded material is difficult and that the complexity of the conduit arrangement raises the cost of the machine.

BRIEF SUMMARY OF THE INVENTION

It is an object of the present invention to provide an improved machine for processing plastic and polymeric materials in which a simpler and more effective transfer passage or passages is or are provided to transfer material from one or more annular processing passage to one or more successive annular processing passage. It is a still further object to provide a processing structure effective to reduce bearing loads. It is a further object to provide a processing structure including transfer passages having a simpler and less expensive construction than previously known processors of this type.

To these ends and in accordance with a feature of the present invention, we have provided a multi-stage rotary processor in which the rotor carrying the processing channels has cylindrical portions between the processing channels which are in close sliding engagement with the housing of the rotor so that channels formed in the housing and extending between annular processing passages are completed by the cylindrical surfaces of the rotor to form transfer passages between the annular processing passages.

In a preferred form these transfer passages are provided by removable flow director units which are held by the processor housing and include surface portions forming part of the surface of the annular housing and with the transfer channels formed in these surface portions of the flow director units. The flow director units may also carry the channel end blocks which extend into the processing channels of the rotor. In a further form, transfer passages and end blocks are circumferentially and/or axially disposed to reduce bearing load to develop opposed radial forces in the processing channels.

BRIEF DESCRIPTION OF THE DRAWINGS

The invention will be described in connection with the attached drawings in which:

FIG. 1 is a perspective view of a rotary processor according to the present invention which view is partly in section with parts broken away and with one of the flow director units of the processor in exploded relation to the remainder of the processor to show various parts;

FIG. 2 is an elevated sectional view of the rotary processor on section line 2—2 of FIG. 1;

FIG. 3 is a simple flow diagram to show paths followed by material in a flow director unit of the rotary processor;

FIG. 4 is a simplified schematic cross-sectional view taken on line 4—4 of FIG. 2 showing the path of movement of a material through a processing passage;

FIG. 5 is a simplified schematic cross-sectional view taken on line 5—5 of FIG. 2 showing the path of movement of material through a succeeding passage;

FIG. 6 is a simplified schematic cross-sectional view taken on the line 6—6 of FIG. 2 showing the path of movement of material through a further passage and its discharge from the processor;

FIG. 7 is a fractional schematic cross-sectional view taken on the line 7—7 of FIG. 3 showing the interior circulatory flow pattern in material passing from one processing passage of the processor and through a transfer channel on its way to a further processing passage.

DESCRIPTION OF THE PREFERRED EMBODIMENT

The multi-stage processor of the present invention provides a novel transfer passage structure giving low pressure drop and low heat loss in passage of material from one processing channel of the rotor to a succeeding processing channel in a further stage of the processor. As explained more fully below, the transfer passage extending between one processing channel and a succeeding processing channel includes a transfer channel in an annular surface portion of the housing with an open side of the channel facing and sealed by a moving surface of the rotor. This arrangement can provide the shortest path from one processing channel to a succeeding processing channel and in a preferred configuration will secure the special advantage that the dragging action of the moving surface can assist flow of material and cause circulatory movement of the material in the transfer passage so that the passage is self-cleaning.

The transfer channels may be arranged in a variety of relations to direct and control the movement of material to be treated to selected processing passages as shown in the drawings. In some of these relations, a transfer channel or channels may be disposed with respect to other channels so that radial forces developed in other processing passages or balanced against radial forces developed in other processing passages or that a special cooperative interaction between passages is secured; but it is to be understood that the invention is not limited to structures involving such relations between transfer channels.

As shown in FIGS. 1 and 2, a multi-stage processor 10 includes a rotor 12 mounted for rotation in a housing 14 on a drive shaft 16 journaled in end walls 18 of the housing 14. The rotor 12 has substantially cylindrical surface portions 20 in sliding sealing engagement with the interior annular surface 22 of the housing 14 and is formed with a plurality of coaxial annular processing channels 24, 26, 28, 30, 32, 34, 36, 38, 40, 42 and 44, each having opposed side walls 46 extending inwardly from the cylindrical surface portions 20 of the rotor 12. Thus, the cylindrical surface portion 20 of the rotor 12 and the annular interior surface 22 of the housing cooperate to form with the channels 24, 26, 28, 30, 32, 34, 36, 38, 40, 42 and 44, a plurality of enclosed annular processing passages 48, 50, 52, 54, 56, 58, 60, 62, 64, 66 and 68.

Channel blocks 70 are provided having a shape complimentary to and fitting closely within each of the processing channels to hold a plastic or a polymeric material for movement relative to the walls 46 of the channels and to block off viscous liquid material carried forward by the walls 46 for discharge as processed material.

One or more inlets 72 through the housing 14 are provided to supply material to be processed to one or more processing passages.

In the processor shown, the transfer channels and their relation to the rotor 12, processing channels 24, 26, etc. and channel blocks 70 are in axially symmetrical relation. That is processing channel 24 of the left end of the rotor has the same size and geometry as channel 44 at the right end and so on for the remainder of the processing channels inwardly from the left and right. The processor may be considered in three sections, a primary or supply section 74 at each end of the rotor and a secondary or treatment section 76 between the two primary sections for receiving and for further processing material from the primary sections.

Referring first to the primary sections 74, in the structure shown, each consists of three annular processing passages 48, 50 and 52 at one end and 64, 66 and 68 at the other and channel blocks 70 associated with each of these passages. Hoppers 78 for introducing material to the processor are disposed relative to each of the primary sections 74 to supply material through inlets 72 to all three of the processing passages of each primary section. In this arrangement, the three processing passages 48, 50 and 52 of one of the primary sections and 64, 66 and 68 of the other primary section operate in parallel so that the melted liquid material processed in each set of three processing passages collects against the end blocks associated with these passages. Transfer channels 80 in an annular surface portion of the housing adjacent the end blocks 70 extend parallel to the axis of the rotor with their open sides disposed to receive processed material from all three of the processing passages in each primary section and to convey it across the cylindrical portions 20 of the primary sections 74 of the rotor 12 for discharge into the outermost of the processing passages 54 and 62 of the secondary section 76. Processing passages 48, 50 and 52 or 64, 66 and 68 will develop somewhat less pressure in the inward passages relative to outwardly situated passages at the channel blocks 70, to cause flow of material from the outer passages 48 or 68 over the inner channel or channels 26 and 28 or 42 and 40 respectively. In movement of the material in the transverse channels 80 over the cylindrical surface portions 20 of the rotor 12, the dragging movement of the cylindrical surface portions 20 acts on the material in the channels transverse to the general flow of material to provide a circulatory flow and self-cleaning action in the channel 80 and to reduce possible dead spots in flow of the material which might delay discharge of the material and result in degradation.

As shown in the drawing, the processing channel end blocks 70 of the secondary section 76 are disposed 180° from the circumferential position of the channel end blocks 70 of the primary sections 74 so that the material from the primary sections entering the outermost passages 54 and 62 of the secondary sections 76 from the primary section transfer channels 80 travels only approximately one-half (½) a revolution before reaching the processing channel end blocks 70 of these outermost processing passages 54 and 62.

In the secondary or treatment section 76 of the processor of the present invention, transfer passages for flow of processed material from one channel to a succeeding channel are provided by transfer channels 90, 92, 94 and 96 formed in the annular surface 22 and extending from positions upstream of the channel blocks 70 of processing passages 54, 56, 60 and 62 to positions downstream of the channel blocks 70 in successive processing passages 56, 58, 58 and 60 respectively with open sides of the transfer channels 90, 92, 94 and 96 facing and sealed along their length by cylindrical surface portions 20 of the rotor 12. It will be understood that portions of the channel blocks 70 in the channels may be cut away or rounded off to allow easier flow through the channels.

Flow of material in the processing passages and the transverse passages may be better understood by consideration of the flow diagram of FIG. 3 which is an idealized and simplified presentation with arrows indicating flow direction in the passages relative to end blocks in the lower channel section of FIG. 1, together with the simplified, sequential cross-section drawings of FIGS. 4, 5 and 6. Referring to FIGS. 1, 2 and 4, liquid material from the primary section 74 at one end of the processor is supplied through transverse channel 80 and enters processing channel 30 of the rotor. The material collects against the channel block 70 and, as shown by the arrows in FIGS. 3 and 4, enters the transfer passage defined by the cylindrical surface portion 20 of the rotor 12 and the transfer channel 90 in the housing. From this transfer passage, the material is conveyed and processed in the processing channel 32 (see FIGS. 3 and 5) and collects against the channel end block 70 in this channel. From this channel 32 the material flows into a transfer passage defined by the cylindrical surface portion 20 of the rotor 12 and the channel 92 in the housing for passage to processing channel 34 as shown by the arrows in FIGS. 3, 5 and 6. Material entering processing channel 34 is conveyed and processed in passage through the channel and is collected as a pool of material against the channel end block 70 for discharge through the discharge opening 100.

The channel blocks 70 of the secondary section 76 are arranged in a line parallel to the axis of the rotor 12 and the transfer channels 90, 92, 94 and 96 extend helically from the upstream sides of the channel blocks 70 in processing channels 30, 32, 36 and 38 to the downstream side of the channel blocks 70 of the succeeding processing channels 32, 34, 34 and 36 respectively. In this arrangement, as shown diagrammatically in FIG. 7, the dragging action on material in the transfer passage by the moving cylindrical surface 20 of the rotor 12 aids in moving the material through the transfer passage and also induces circulatory flow including a component transverse to the general direction of movement of the material in the passage to provide a self-cleaning action and elimination of possible dead spots in the flow of material through the transfer passage.

It is of course possible to dispose the channel blocks 70 of a multi-stage processor in a staggered or helical arrangement, (not shown) such that the transfer channels and passages are parallel to the axis of the rotor. This arrangement secures the self-cleaning action but does not aid in moving the material through the transfer channels.

In the preferred embodiment of the multi-stage processor of the invention, the housing 14 is constructed with a main body portion 102 and one or more removable flow director units 104, 106 and 108 in which the transfer channels are formed and the channel blocks 70 may be mounted. Referring to FIGS. 1 and 2, the flow director unit 106 is mounted in a slot or opening 110 in the main body portion 102 with interior surface portions 112 of the director unit forming part of the annular interior surface 22 of the housing 14 for close sealing engagement with cylindrical portions 20 of the rotor 12. Processing channel blocks 70 are carried by this flow director unit 106 in positions for cooperation with the processing channels 30, 32, 34, 36 and 38 of the rotor 12 to hold material in these processing channels for processing and discharge. Transfer grooves or channels 90, 92, 94 and 96 are cut or otherwise formed on the inner surface 112 of the flow director unit to lead from the upstream side of the processing channel blocks 70 of processing channels 30, 32, 36 and 38 to the downstream side of the processing channel block 70 of the succeeding processing channels 32, 34, 34 and 36 respectively. The cylindrical portions 20 of the rotor 12 seal the open sides of these transfer channels 90, 92, 94 and 96 to form enclosed transfer passages.

Not only is this structure less expensive to manufacture because of the ease of forming transfer grooves or channels in the removable flow director units rather than on the interior of a housing; but the structure allows the use of alternative flow director units with different arrangements of transfer grooves or channels and even different arrangements of processing channel blocks and channels for use of the housing with rotors having different processing channel sizes or arrangements.

In the processor shown in FIGS. 1 and 2 a particular advantage of the disposition of blocking elements and transfer channels on opposing sides of the rotor 12 is to minimize bearing pressure and shaft deflection. That is, considering a processing passage, the action of the channel walls in dragging material toward the processing channel and block generates pressure which is progressively higher in the direction of the channel end block. The resulting unbalanced radial pressure tends to deflect the rotor and may interfere with effective sealing engagement between the cylindrical portions of the rotor and the interior annular surface of the housing.

Where channel end blocks and transfer channels are on one side of the rotor as when a single flow director unit is used, the unbalanced radial pressure from all the channels is concentrated at the same angular position. Thus it maximizes shaft deflection. But to permit a leak-free seal design, as well as optimum performance and minimum bearing load, the shaft deflection should be kept at a minimum.

This may be achieved where channel end blocks and transfer channels are arranged to develop balanced opposing forces. Thus where two or more flow director units are used, flow director units may be disposed in angular relation such that the unbalanced radial pressures generated in a processing passage or group of processing passages opposes and neutralizes the unbalanced radial pressures generated in another processing passage or group of processing passages. When two flow director units are used, they may be disposed at 180° from each other.

In the multi-stage processor such as shown in FIGS. 1 and 2 there are provided three melting passages in the primary processing sections on either side, which feed melt into further processing passages in the central processing section and ultimately to discharge. It is to be understood that other numbers and arrangements of passages may be used. These further processing passages in the central processing section may effect such action as devolatilizing, mixing, homogenizing and so on. The geometry of such further processing passages will be determined following the teachings of the earlier application referred to above.

In a particular machine having a barrel diameter at 12 inches and a total length of the shaft 43 in. under optimum operating conditions with all channel blocks placed at the same angular position, the bearing load might reach 25,000 lbs and maximal shaft deflection would be about 50–60 mils. Thus, the maximum resulting clearance would be 100–120 mils between the rotor and the housing.

In the design employing three flow director units disposed as shown, maximum shaft deflection may be reduced to 5–10 mil. level, and bearing loads reduced from 25,000 lbs. to 5000 lbs. In this particular case the processing channel blocks of the six melting stages are placed in the two end flow director units and the rest of the processing channel blocks (concentrated in the center region) are placed in the other flow director unit 180° from the former. The transition from processing passages of which the processing channel blocks are on one side to processing passages of which the processing channel blocks are displaced 180° suitably is effected between the melting passages and mixing passages. Although only half the mixing passage is effective, this poses no disadvantage because (a) the mixing passages are intended to operate only partly full and (b) partial recycling can be permitted by controlled clearance between the walls of the mixing passages and mixing channel blocks to provide back mixing (which "washes" out inlet concentration non-uniformities). Moreover the unused half of the mixing chamber can be placed under vacuum to allow devolatilization.

Having thus described our invention, what we claim as new and desire to secure by Letters Patent of the United States is:

1. In a processor for plastic and polymeric materials which are or become in the course of processing viscous liquids comprising:

(a) a rotor including a substantially cylindrical surface portion and a plurality of coaxial channels having opposing side walls extending inwardly from said cylindrical surface portions, (b) a stationary element providing a closure surface coaxial with said rotor and cooperating with said cylindrical surface portion of said rotor to form with said channels, enclosed annular passages, (c) inlets for polymeric or plastic material to said annular passages, (d) means for causing relative rotation between said rotor and said closure surface providing element about their common axis to move said side walls and said cylindrical surface portion of said rotor relative to said closure surface, (e) an outlet from each of said annular passages circumferentially spaced from the inlets to that passage in the direction of rotation of said rotor relative to said stationary closure surface, (f) a blocking member disposed in each of said annular passages between the outlet and the inlet of each passage in the direction of rotation of said rotor, the improvement which comprises a transfer channel formed in said closure surface of said stationary element so that the open side of the transfer channel faces said cylindrical surface portion of said rotor and extending from a first annular passage to a second of said annular passages, portion s of the length of the open side of said transfer channel extending over and communicating with the channels of said annular passages to serve as an outlet to discharge material from said first annular passage and as an inlet for said second annular passage to receive material from said first annular passage and where portions of the length of the open side of the transfer channel between said annular passages are sealed by said cylindrical surface portion of said rotor to form an enclosed transfer passage in which said sealing cylindrical portion of said rotor is movable relative to said transfer channel to act on material in said transfer passage.

2. A processor as defined in claim 1, in which said transfer channel extends over and communicates with at least one additional annular channel portion of an annular passage after said second annular channel to serve as an outlet to receive material from, or to serve as an inlet to discharge material into said second and additional annular passages.

3. A processor as defined in claim 1 in which said transfer channel is located and arranged relative to the processing channel of a first annular passage to receive material for movement through said transfer passage and is disposed relative to the processing channel of another of said annular passages to discharge material from said transfer passage into said other annular passage.

4. A processor as defined in claim 2, in which said transfer channel is disposed to receive material from at least said first and second annular passages and to discharge material into at least one of said additional annular passages.

5. A processor as defined in claim 4 in which a common supply for polymeric or plastic material is connected to introduce said material to said first and second annular passages and said transfer channel extends in a direction substantially parallel to the axis of said rotor to at least one additional annular passage after said second annular passage to receive material from at least said first and second annular passages and to discharge material into said additional annular passage.

6. A processor as defined in claim 3 in which said transfer channel extends generally helically in the direction of rotation of said rotor from a position over and communicating with the annular channel portion of one of said annular passages to receive material from said passage to a position over and communicating with an annular channel portion of another of said annular passages.

7. A processor as defined in claim 6 in which the blocking members in said annular passages are disposed in a line parallel to the axis of said rotor.

8. In a processor for plastic and polymeric materials which are or become in the course of processing viscous liquids comprising:

(a) a rotor including a substantially cylindrical surface portion and a plurality of coaxial channels having opposing side walls extending inwardly from said cylindrical surface portions, (b) a stationary element providing a closure surface coaxial with said rotor and cooperating with said cylindrical surface portion of said rotor to form with said channels, enclosed annular passages, (c) inlets for polymeric or plastic material to said annular passages, (d) means for causing relative rotation between said rotor and said closure surface providing element about their common axis to move said side walls and said cylindrical surface portion of said rotor relative to said closure surface, (e) an outlet from each of said annular passages circumferentially spaced from the inlets to that passage in the direction of rotation of said rotor relative to said stationary closure surface, (f) a blocking member disposed in each of said annular passages between the outlet and the inlet of each passage in the direction of rotation of said rotor, the improvement which comprises a plurality of transfer channels to receive material from at least one annular passage and discharge it to at least one further annular passage, said transfer passages being formed in said closure surface of said stationary element so that the open side of the transfer channel faces said cylindrical surface portions of said rotor and extending from said at least one annular passage to said further annular passage, portions of the length of the open side of said transfer channels extending over and communicating with the channels forming part of said annular passages to serve as an outlet to discharge material from said at least one annular passage and as an inlet for said further annular passage to receive material from said at least one annular passage and where portions of the length of the open side of the transfer channels between said annular passages are sealed by said cylindrical surface portion of said rotor to form an enclosed transfer passage in which said sealing cylindrical portion of said rotor is movable relative to said transfer channel to act on material in said transfer passage and where said blocking members and transfer channels are circumferentially spaced about said stationary closure surface to develop radial forces in at least one of said annular passages through unsymmetrical development of pressure in said annular passage opposing the radial force developed in at least one other of said annular passages by unsymmetrical development of pressure in said other annular passage or passages.

9. A processor as defined in claim 8 in which said blocking members and transfer channels are disposed to develop substantially balanced opposing radial forces to minimize pressure on bearings on which said rotor may be mounted.

10. A processor as defined in claim 9 in which said annular passages, blocking members and transfer channels are axially arranged to develop radial forces in at least one of said annular passages opposing radial forces developing in at least one other of said annular passages substantially to provide substantial axial balance of said radial forces.

11. A processor as defined in claim 10 in which said annular passages, blocking members and transfer channels are in axial symmetrical relation.

12. In a processor for plastic and polymeric materials which are or become in the course of processing viscous liquids comprising:
  (a) a rotor including a substantially cylindrical surface portion and a plurality of coaxial channels having opposing side walls extending inwardly from said cylindrical surface portions,
  (b) a stationary element providing a closure surface coaxial with said rotor and cooperating with said cylindrical surface portion of said rotor to form with said channels enclosed annular passages,
  (c) inlets for polymeric or plastic material to said annular passages,
  (d) means for causing relative rotation between said rotor and said closure surface providing element about their common axis to move said side walls and said cylindrical surface portion of said rotor relative to said closure surface,
  (e) an outlet from each of said annular passages circumferentially spaced from the inlets to that passage in the direction of rotation of said rotor relative to said stationary annular surface,
  (f) a blocking member disposed in each of said annular passages between the outlet and the inlet of each passage in the direction of rotation of said rotor, the improvement where said processor comprises a processing section including axially outer processing passages at opposite ends of said section, inlets for material to said outer processing passages, and transfer channels formed in said closure surface of said stationary element so that the open side of the transfer channels faces said cylindrical surface of said rotor, portions of the length of the open sides of said transfer channels extending over and communicating with channels forming parts of said outer annular passages to serve as outlets for material processed in said outer annular processing passages, portions of the length of the open side of said transfer channels also extending over and communicating with channels forming parts of annular processing passages inward of and adjacent to said outer annular passages to serve as inlets to said adjacent annular processing passages, said transfer channels being directed generally helically in the direction of rotation of said rotor from said outlets to said inlets and where portions of the length of the open side of the transfer channels between said annular passages are sealed by said cylindrical surface portion of said rotor to form an enclosed transfer passage in which said sealing cylindrical portion of said rotor is movable relative to said transfer channel to act on material in said transfer passage.

13. A processor as defined in claim 12 in which said processing section is located in an axially central position of said rotor and primary processing sections are disposed at opposite ends of the central processing section to process and feed material to the material inlets of said outer annular processing passages of said central processing section, each of said primary processing sections comprising:

(1) a plurality of annular processing passages,
  (2) a common supply for providing a polymeric or plastic material connected to introduce said material to the inlets of the annular processing passages of each primary section, and
  (3) a transfer channel extending in a direction substantially parallel to the axis of said rotor to receive material from the outlets of the annular processing passages of each primary section, to convey the material toward said central processing section and to discharge the material to the inlet of the outer annular processing passage of the central processing section to which each primary section is adjacent.

14. A processor as defined in claim 13 in which the transfer channels and blocking members in said primary processing sections are disposed opposite the blocking members and transfer channels in said central processing section to develop radial forces in the annular passages of said primary sections through unsymmetrical development of pressure in the annular passages of said primary processing sections opposing the radial forces developed in the annular processing passages of the central section.

15. A processor as defined in claim 14 in which said annular passages, blocking members and transfer channels are in axial symmetrical relation.

16. A processor as defined in claim 1 in which said annular surface comprises a main body portion and a flow director unit held in said main body portion and having a surface portion forming part of said annular surface, said transfer channel being located in said surface portion of said flow director unit.

17. A processor as defined in claim 16 in which said blocking members are supported by said flow director unit.

18. A processor as defined in claim 2 in which said annular surface comprises a main body portion and a flow director unit held in said main body portion and having a surface portion forming part of said annular surface, said transfer channel being located in said surface portion of said flow director unit, and said blocking members are supported by said flow director unit.

19. A processor as defined in claim 3 in which said annular surface comprises a main body portion and a flow director unit held in said main body portion and having a surface portion forming part of said annular surface, said transfer channel being located in said surface portion of said flow director unit, and said blocking members are supported by said flow director unit.

20. A processor as defined in claim 4 in which said annular surface comprises a main body portion and a flow director unit held in said main body portion and having a surface portion forming part of said annular surface, said transfer channel being located in said surface portion of said flow director unit, and said blocking members are supported by said flow director unit.

21. A processor as defined in claim 5 in which said annular surface comprises a main body portion and a flow director unit held in said main body portion and having a surface portion forming part of said annular surface, said transfer channel being located in said surface portion of said flow director unit, and said blocking members are supported by said flow director unit.

22. A processor as defined in claim 8 in which said annular surface comprises a main body portion and a plurality of flow director units held in said main body portion, each flow director unit having surface portions forming part of said annular surface, said transfer channels being located in said surface portions and said blocking members being supported by said flow director units and said flow director units being circumferentially spaced to develop said opposing radial forces in said annular passages.

23. A processor as defined in claim 9 in which said annular surface comprises a main body portion and a plurality of flow director units held in said main body portion, each flow director unit having surface portions forming part of said annular surface, said transfer channels being located in said surface portions and said blocking members being supported by said flow director units and said flow director units being circumferentially spaced to develop said opposing radial forces in said annular passages.

24. A processor as defined in claim 11 in which said annular surface comprises a main body portion and a plurality of flow director units held in said main body portion, each flow director unit having surface portions forming part of said annular surface, said transfer channels being located in said surface portions and said blocking members being supported by said flow director units and said flow director units being circumferentially spaced to develop said opposing radial forces in said annular passages.

25. A processor as defined in claim 13 in which said annular surface comprises a main body portion, a flow director unit for each primary processing section and a flow director unit for said central section, each said flow director unit being held in said main body portion and having a surface portion forming part of said annular surface, the flow director units for said primary sections each including a transfer channel located in said surface portion and extending in a direction substantially parallel to the axis of the rotor to receive material from the outlets of the annular processing passages of each primary section to convey the material toward said central processing sections and to discharge the material to the inlet of the outer annular processing passages of the central processing section to which each primary section is adjacent, and the flow director unit for said central section having transfer channels extending generally helically in the direction of rotation of said rotor to receive material discharged from an outer annular passage of said central section and to introduce material into the inlet of an inwardly adjacent annular processing passage.

26. In a processor for plastic and polymeric materials which are or become in the course of processing viscous liquids comprising:
(a) a rotor including a substantially cylindrical surface portion and a plurality of coaxial annular channels having opposing side walls extending inwardly from said cylindrical surface portion,
(b) an annular surface coaxial with said rotor and cooperating with said cylindrical surface portion to form with said channels enclosed annular passages,
(c) inlets for polymeric or plastic material to said annular passages,
(d) means for causing relative rotation between said rotor and said annular surface member about their common axis to move said side walls and cylindrical surface portions relative to said annular surface.
(e) an outlet from each of said annular passages circumferentially spaced from the inlets to that passage in the direction of rotation of said rotor relative to said annular surface.
(f) a blocking member disposed in each of said annular passages between the outlet and the inlet of each passage in the direction of rotation of said rotor to hold a body of material in each annular passage against movement with the side walls of the annular channel forming part of said passage so that there is relative movement between the side walls of each annular channel and the body of material in the passage whereby said side walls operate to drag forward material in contact with said walls for processing and discharge, the improvement which comprises a plurality of transfer passages to receive material from at least one annular passage and discharge it to at least one further annular passage and in which said blocking members and transfer passages are circumferentially spaced about said annular surface to develop radial forces in at least one of said annular passages through unsymmetrical development of pressure in said annular passage opposing the radial force developed in at least one other of said annular passages by unsymmetrical development of pressure in said other annular passage or passages.

27. A processor as defined in claim 26 in which the said blocking members and transfer passages are disposed to develop substantially balanced opposing radial forces to minimize pressure on bearings on which said rotor may be mounted.

28. A processor as defined in claim 27 in which the said annular passages, blocking members and transfer passages are axially arranged to develop radial forces in at least one of said annular passages opposing radial forces developed in at least one other of said annular passages to provide substantial axial balance of said radial forces.

29. A processor as defined in claim 28 in which said annular passages, blocking members and transfer passages are in axial symmetrical relation.

30. A processor as defined in claim 29 including primary processing sections disposed at opposite ends of a central processing section to process and feed materials to material inlets of outer annular processing passages of a central processing section, the blocking members and transfer passages of said primary processing sections being 180° from the blocking members and transfer passages of said central processing section to develop in the processing passage of said primary sections radial forces substantially balancing radial forces developed in said central processing section.

* * * * *